United States Patent
Miyamoto (10) Patent No.: US 7,198,498 B2
(45) Date of Patent: Apr. 3, 2007

(54) CARD CONNECTOR

(75) Inventor: Osamu Miyamoto, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 0 days.

(21) Appl. No.: 11/476,776

(22) Filed: Jun. 29, 2006

(65) Prior Publication Data

US 2007/0004283 A1    Jan. 4, 2007

(30) Foreign Application Priority Data

Jul. 4, 2005    (JP) ............... 2005-194944

(51) Int. Cl.
*H01R 13/62*    (2006.01)
(52) U.S. Cl. .................... 439/159; 439/630
(58) Field of Classification Search ........... 439/630, 439/188, 159, 157
See application file for complete search history.

(56) References Cited

U.S. PATENT DOCUMENTS

| 6,609,936 | B2 * | 8/2003 | Bricaud et al. ............. 439/630 |
| 6,811,443 | B2 * | 11/2004 | Machihara et al. ......... 439/630 |
| 7,037,125 | B1 * | 5/2006 | Kuan et al. .................. 439/159 |
| 2002/0102882 | A1 * | 8/2002 | Tanaka ........................ 439/630 |
| 2003/0199186 | A1 * | 10/2003 | Ji et al. ....................... 439/159 |

FOREIGN PATENT DOCUMENTS

JP    2001-291553    10/2001

* cited by examiner

*Primary Examiner*—Tulsidas C. Patel
*Assistant Examiner*—Harshad C Patel
(74) *Attorney, Agent, or Firm*—Takeuchi & Kubotera, LLP (57) ABSTRACT

A card connector includes a housing for accommodating a card; a terminal for contacting with the card when the card is inserted into the housing; an ejection unit for placing the card and capable of sliding in the housing along a direction that the card is inserted into and pulled out; and a spring member for urging the ejection unit in a direction that the card is pulled out. An elastic member is disposed in one of the ejection unit and the housing, and an escape space is formed in the other of the ejection unit and the housing for escaping a deformation of the elastic member. When the card contacts with the terminal, the escape space releases at least a part of the deformation of the elastic member. When the card is disconnected from the terminal, the elastic member deforms to push the ejection unit upwardly.

10 Claims, 9 Drawing Sheets

CARD CONNECTOR

BACKGROUND OF THE INVENTION AND RELATED ART STATEMENT

The present invention relates to a card connector, and more specifically, to a card connector with an ejection mechanism of a push-push type.

In a conventional card connector with an ejection mechanism of a push-push type, a card is pushed to operate the ejection mechanism. In such a card connector, a card jumping prevention mechanism may be provided for preventing a card from jumping out. In Patent Reference, a tongue piece is provided at an opening portion of a shell for elastically contacting with a surface of a card. Accordingly, when the card is discharged, the tongue piece breaks the card, thereby preventing the card from jumping out.

Patent Reference: Japanese Patent Publication No. 2001-291553

In the conventional connector described above, the card contacts with a contact portion of the connector in a direction opposite to a direction that the tongue piece contacts with the card. As a result, there may be a difference in a pressing force against the card between when the card contacts with the contact portion of the connector and when the card does not contact with the contact portion of the connector. Accordingly, it is difficult to press the card with the tongue piece when the card does not contact with the contact portion of the connector, thereby making it difficult to effectively prevent the card from jumping out.

When it is arranged such that the tongue piece presses the card with a strong force, the card tends to be inclined, thereby making the contact between the card and the contact portion unstable. Further, it is arranged such that the tongue piece presses the card with a strong force, it is difficult to smoothly discharge the card.

As described above, in the ejection mechanism of a push-push type, the card is pushed into the card connector to operate the ejection mechanism. In such a card connector, a finger pushing the card prevents the card from jumping out. In case that a finger slips off the card, an elastic force accumulated in the ejector mechanism may be suddenly released. In such a case, it is difficult to effectively prevent the card from jumping out with the tongue piece.

In view of the problems described above, an object of the present invention is to provide a card connector with an ejection mechanism capable of effectively preventing the card from jumping out.

Further objects will be apparent from the following description of the invention.

SUMMARY OF THE INVENTION

According to the present invention, a card connector includes a housing for accommodating a card; a terminal for contacting with the card when the card is inserted into the housing; an ejection unit for placing the card and capable of sliding in the housing along a direction that the card is inserted into and pulled out; and a spring member for urging the ejection unit in a direction that the card is pulled out.

In the card connector, an elastic member is disposed in one of the ejection unit and the housing, and an escape space is formed in the other of the ejection unit and the housing for escaping a deformation of the elastic member. When the card contacts with the terminal, the escape space releases at least a part of the deformation of the elastic member. When the card is disconnected from the terminal, the elastic member deforms to push the ejection unit upwardly. When the ejection unit slides in the housing toward the direction that the card is pulled out to release the card from the terminal, the elastic member comes off the escape space to control a force of the spring member, thereby preventing the card from jumping out from the housing.

According to the present invention, the escape space may have a wall surface extending a direction crossing the direction that the ejection unit slides. Further, the escape space may be formed of a hole or a groove.

According to the present invention, the elastic member may be an elastic piece disposed in the ejection unit, and the escape space may be formed in a bottom surface of the housing.

According to the present invention, the elastic member may be disposed on the bottom surface of the housing, and the escape space may be formed in the ejection unit.

According to the present invention, it is configured that the elastic member may be disengaged from the escape space when the ejection unit starts sliding toward the direction that the card is pulled out. Further, the card connector may further include an inclined portion extending from the escape space in the direction that the card is pulled out.

According to the present invention, a card connector includes a housing for accommodating a card; a terminal for contacting with the card when the card is inserted into the housing; an ejection unit for placing the card and capable of sliding in the housing along a direction that the card is inserted into and pulled out; and a spring member for urging the ejection unit in a direction that the card is pulled out.

In the card connector, an elastic member is disposed in one of the ejection unit and the housing, and an escape space is formed in the other of the ejection unit and the housing for escaping a deformation of the elastic member. When the card contacts with the terminal, the escape space releases the deformation of the elastic member. When the card is disconnected from the terminal, the elastic member deforms to push the ejection unit upwardly and press the card against the housing.

According to the present invention, the card connector may further include a protruding portion disposed to face the elastic member for holding the ejection unit inbetween with the elastic member. The protruding portion may be formed of an elastic piece.

BRIEF DESCRIPTION OF THE DRAWINGS

FIGS. 5(a) and 5(b) are sectional views of the card connector, wherein FIG. 5(a) is a sectional view taken along a line 5(a)—5(a) in FIG. 4(a), and FIG. 5(b) is a sectional view taken along a line 5(b)—5(b) in 4(b);

DETAILED DESCRIPTION OF PREFERRED EMBODIMENTS

Hereunder, embodiments of the present invention will be explained with reference to the accompanying drawings. According to the present invention, a card connector is provided with an ejection mechanism. The ejection mechanism is a push-push type, in which it is possible to freely insert and pull out a card through pushing the card.

Figure 1:
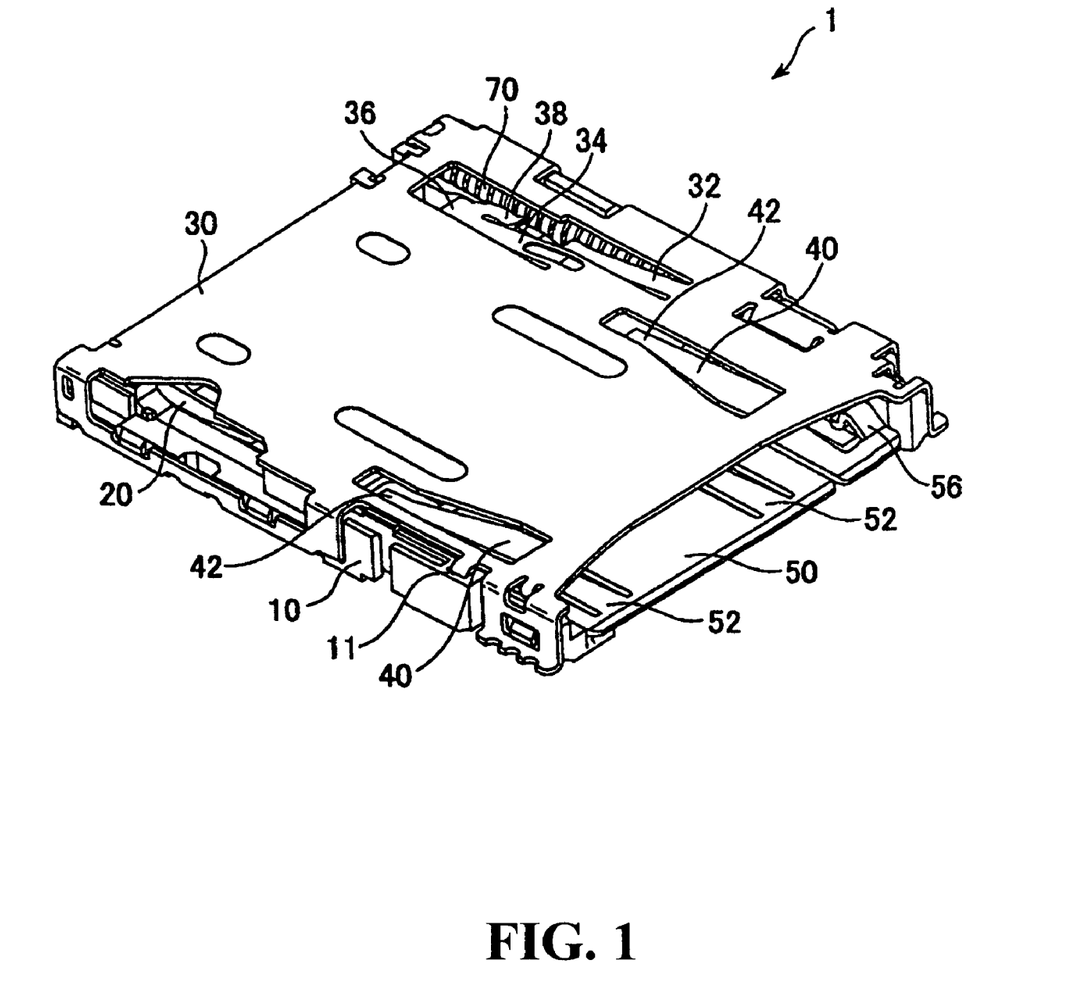
FIG. 1 is a perspective view showing a card connector according to an embodiment of the present invention.
Figure 2:
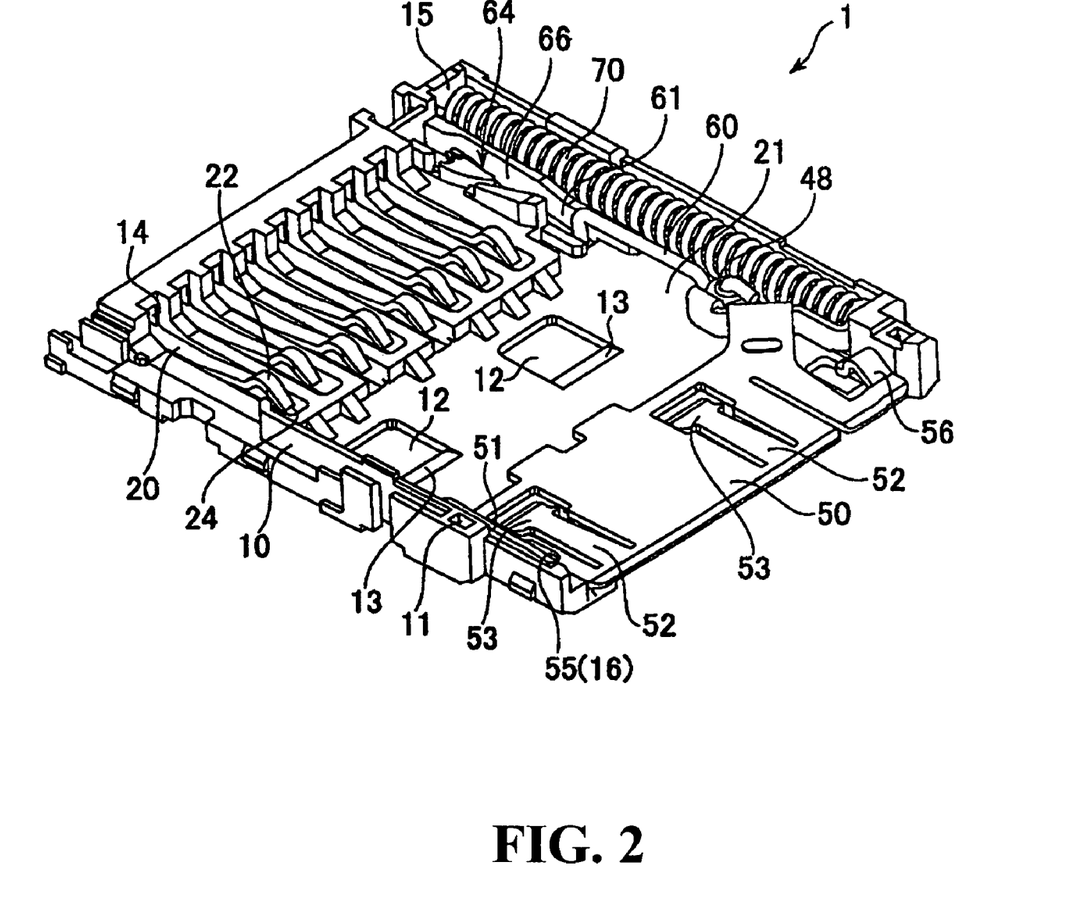
FIG. 2 is a perspective view showing the card connector shown in FIG. 1 without a cover.
Figure 3:
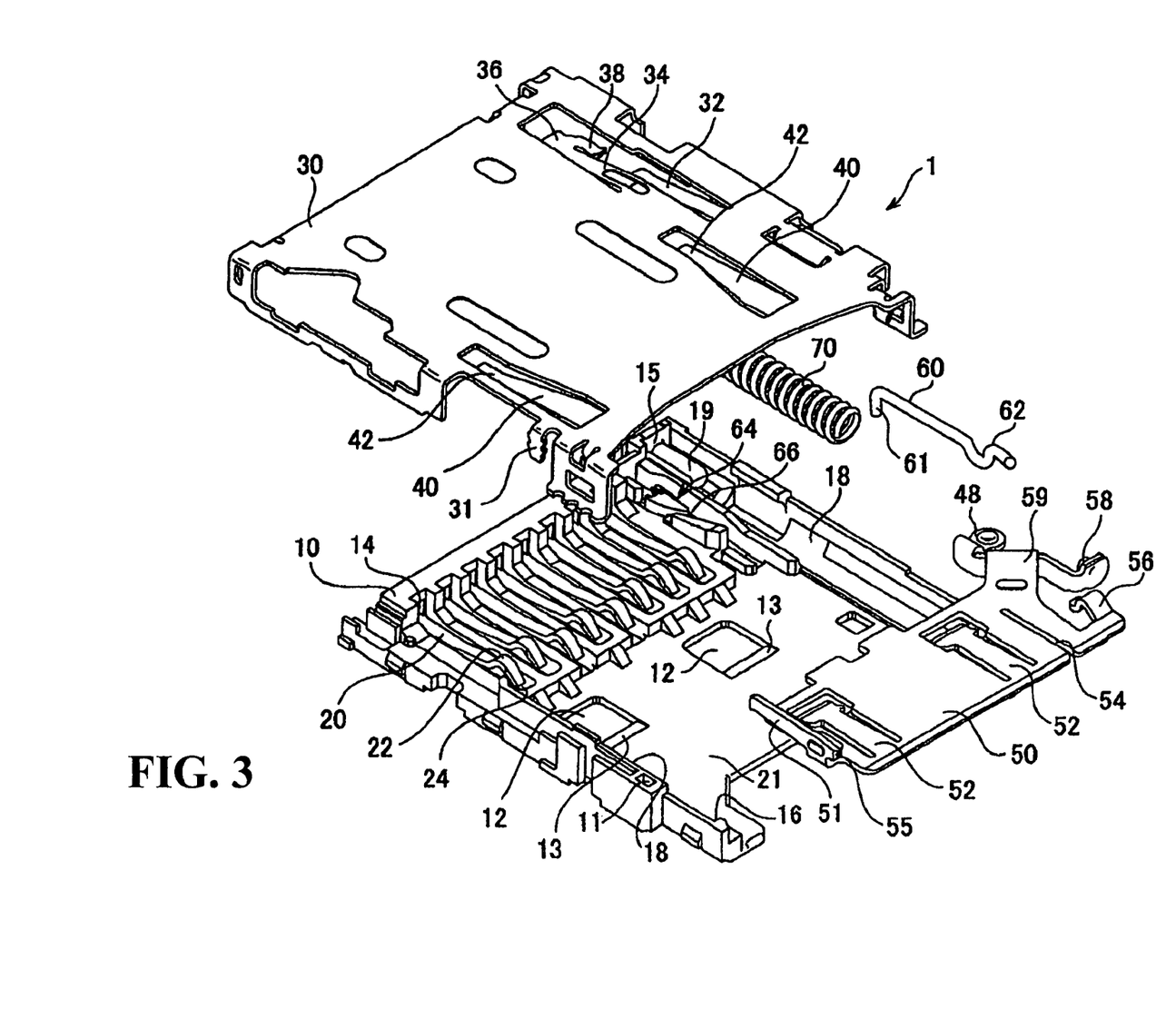
FIG. 3 is an exploded perspective view showing the card connector shown in FIG. 1.

FIG. 1 is a perspective view showing a card connector 1 according to the embodiment of the present invention. FIG. 2 is a perspective view showing the card connector 1 shown in FIG. 1 without a cover. FIG. 3 is an exploded perspective view showing the card connector 1 shown in FIG. 1. FIGS. 4(a) and 4(b) are plan views showing the card connector 1 when a card 3 is inserted therein. In the present invention, the card 3 may include a mini SD card and a micro SD card. In the embodiment, a micro SD card is used as an example.

As shown in FIGS. 1 to 3, the card connector 1 includes a housing 10 made of an insulating material such as a resin; terminals 20 disposed in the housing 10; an ejector 50; a pin 60; a spring 70; and a cover 30 made of metal for covering the housing 10. After main components are assembled in the housing 10, the cover 30 is attached to the housing 10 from above, thereby assembling the card connector 1 having an opening portion at a rear side thereof for inserting a card. A fitted-in portion 31 provided on a sidewall of the cover 30 is fitted into a hole 11 formed in the housing 10, so that the cover 30 is attached to the housing 10.

A plurality of terminal fixing holes 14 is formed in a front surface of the housing 10 for accommodating the terminals 20. Each of the terminals 20 is inserted from a front side of the housing 10 and fixed to corresponding one of the terminal fixing holes 14. When the card 3 is inserted into the card connector 1, corresponding terminal portions (not shown) formed on a bottom surface of the card 3 contact with terminal contacts 22 formed at distal ends of the terminals 20. When the terminal portions of the card 3 contact with the terminal contacts 22, the terminal contacts 20 deform downwardly along terminal grooves 24 for a specific amount.

The ejector 50 is made of metal and disposed inside the housing 10 at a rear side thereof. In a state that the card 3 is placed on the ejector 50, the ejector 50 is capable of sliding inside the housing 10 in a direction that the card 3 is inserted and pulled out. For example, the ejector 50 slides between a pulled-out position shown in FIG. 4(a) and a locked position shown in FIG. 4(b). As shown in FIG. 4(a), at the pulled-out position, the card 3 is simply placed on the ejector 50 just before the card 3 is pulled out from the housing 10. In this state, the card 3 is disconnected from the terminals 20. As shown in FIG. 4(b), at the locked position, the card 3 returns slightly after the card 3 is forcefully pushed into the housing 10. In this state, the card 3 is locked at a specific position and connected to the terminals 20.

In the embodiment, the ejector 50 has a plate shape extending over a width of the housing 10 in a direction perpendicular to the direction that the card 3 is inserted and pulled out. Further, the ejector 50 abuts against at least one of inner walls 18 of the housing 10, and is held away from a bottom surface 21 of the housing 10. The ejector 50 is provided at two side portions thereof with a card contacting portion 59 and a sidewall 51 both extending in a direction perpendicular to the bottom surface 21 of the housing 10.

As shown in FIG. 3, the sidewall 51 is curved toward the card contacting portion 59, so that a distance between the sidewall 51 and the card contacting portion 59 decreases toward the front side of the card connector 1. The sidewall 51 is capable of elastically deforming in a horizontal direction (width direction). Further, the sidewall 51 is provided with a rib having a convex shape at a side facing one of the inner walls 18, so that the ejector 50 slides smoothly. When the card 3 is placed on the ejector 50, the card 3 is situated and held between the card contacting portion 59 and the sidewall 51, thereby preventing the card 3 from jumping out.

A rear edge surface 55 is disposed on the ejector 50 at one side thereof in the width direction for abutting against an inner protruding surface 16 disposed on the housing 10 at one side thereof in the width direction. The pin 60 engages a cam groove 66. Accordingly, the ejector 50 is restricted in moving inside the housing 10 toward the rear side thereof and coming off from the housing 10.

A spring contacting portion 58 is disposed on the ejector 50 at the other side thereof in the width direction for abutting against a rear surface of the spring 70 disposed on the housing 10 at the other side thereof in the width direction. As described above, the pin 60 engages the cam groove 66. Accordingly, the ejector 50 is restricted in moving inside the housing 10 toward the front side thereof. A front surface of the spring 70 abuts against a front inner wall 15 of the housing 10 in a state that a supporting shaft 19 is inserted into the spring 70. Accordingly, the spring contacting portion 58 receives an elastic force of the spring 70, so that the ejector 50 is always urged toward the rear side of the housing 10, that is, in the direction that the card 3 is pulled out from the card connector 1.

When the card 3 is inserted into the card connector 1, the ejector 50 positions and engages the card 3 at a center position thereof. For the positioning, the card 3 is provided with an inclined surface 25 having a width increasing from a front side toward a rear side at one side thereof in the width direction. The card contacting portion 59 of the ejector 50 is provided with an inclined surface corresponding to the inclined surface 25. A recess portion 26 recessed inwardly in the width direction is formed in the card 3 at a position closer to a card insertion side relative to the inclined surface 25 for the positioning and engagement. A card engaging portion 56 is provided in the ejector 50 for engaging the recess portion 26. The card engaging portion 56 is formed of a part of a bottom surface of the ejector 50 bending at a right angle and having a bent top portion to form a substantially right-angle triangle shape having a steep slope from a front side to a rear side. The card engaging portion 56 elastically protrudes downwardly below the bottom surface of the ejector 50 and is arranged to be capable of deforming.

When the card 3 is inserted into the card connector 1, the inclined surface 25 of the card 3 proceeds inside the housing 10 while pushing the card engaging portion 56 to elastically deform downwardly. When the recess portion 26 reaches the card engaging portion 56, the card engaging portion 56 returns to an original state before the elastic deformation to snap-fit in the inclined surface 25. In this state, the inclined surface 25 of the card 3 abuts against the card contacting portion 59 through elasticity of the sidewall 51. As a result, the card 3 lightly engages the ejector 50 and is set at a specific position. When the card 3 is pulled toward the rear side of the card connector 1 with a specific force, the card 3 is disengaged from the card engaging portion 56. In the embodiment, a cut portion 54 may be formed in the card engaging portion 56 at a side portion thereof along a direction that the ejector 50 slides, so that the card engaging portion 56 deforms at a portion surrounding the cut portion 54. Accordingly, it is possible to easily engage the card 3 with the card engaging portion 56, that is, easily deform the card engaging portion 56.

When the card 3 engages the card engaging portion 56, it is possible to prevent the card 3 from jumping out from the card connector 1 when the card 3 is pulled out from the card connector 1. In a conventional connector, a card pressing spring is disposed on a cover for pressing a card downwardly from one side or from above, thereby preventing the card from jumping out. In the embodiment, the card connector 1 is provided with pressing springs 40. The pressing springs 40 are formed of cut portions formed in parts of an upper plate of the cover 30. The cut portions have free ends extending in the direction that the card 3 is inserted into the card connector 1, and the free ends are bent downwardly toward the front side of the card connector 1 to form the pressing springs 40.

When the spring 70 has a strong force, it is difficult to completely prevent the card 3 from jumping out with the pressing springs 40 and the engagement described above. Accordingly, it is necessary to adjust the force of the spring 70, thereby making it possible to securely prevent the card 3 from jumping out. In the embodiment, jumping prevention springs 52 formed of elastic pieces are formed in the bottom surface of the ejector 50 to protrude. Escape spaces 12 are formed in the bottom surface 21 of the housing 10, so that elastic portions, especially distal end portions 53, of the jumping prevention springs 52 can freely deform in the escape spaces 12. With the configuration described above, it is possible to adjust the force of the spring 70.

Figure 4:
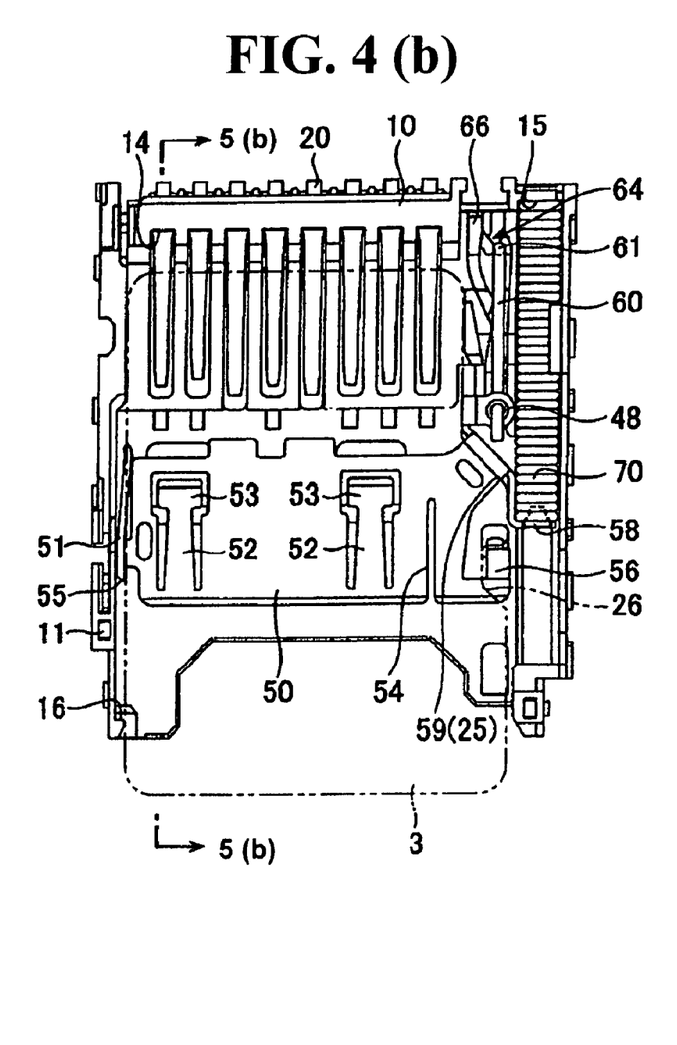
FIGS. 4(a) and 4(b) are plan views showing the card connector when a card is inserted therein.
Figure 5:
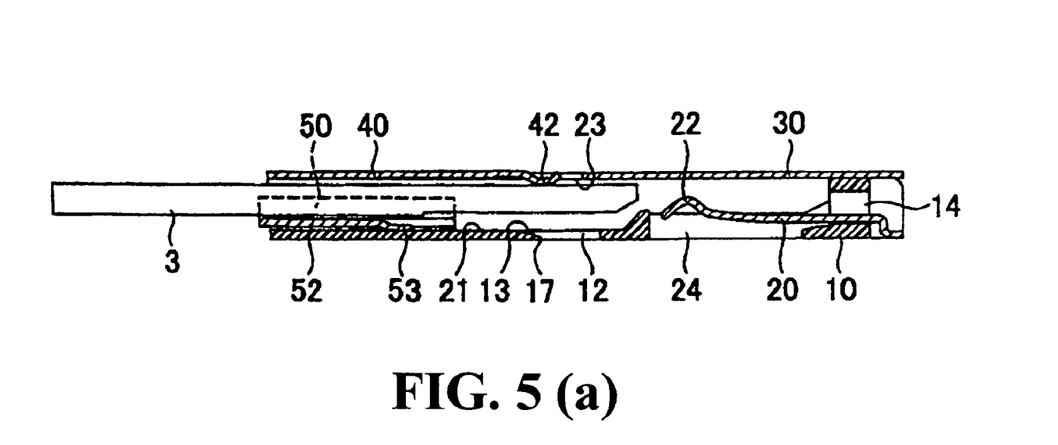
Figure 6:
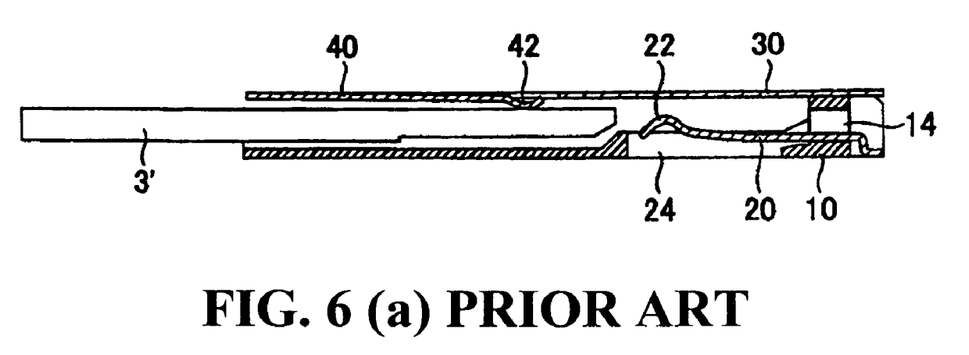
FIGS. 6(a) and 6(b) are sectional views showing a conventional card connector.

With reference to FIGS. 5(a), 5(b), 6(a), and 6(b), the jumping prevention springs 52 and the escape spaces 12 will be explained in more detail. FIG. 5(a) is a sectional view taken along a line 5(a)—5(a) in FIG. 4(a). FIG. 5(b) is a sectional view taken along a line 5(b)—5(b) in FIG. 4(b). In the figures, no card is shown. FIGS. 6(a) and 6(b) are sectional views showing a conventional card connector corresponding to FIGS. 5(a) and 5(b).

In the embodiment, the jumping prevention springs 52 may be arranged at two positions along the width direction of the ejector 50. For example, a portion of the bottom surface of the ejector 50 is cut to form a free end extending in the direction that the card 3 is inserted into the card connector 1. Then, the free end is bent downwardly toward the front side of the card connector 1. Accordingly, the jumping prevention springs 52 are arranged to protrude from the bottom surface of the ejector 50. The distal end portions 53 of the jumping prevention springs 52 may have a large width for holding the ejector 50 strongly. Further, the distal end portions 53 may be inclined upwardly, thereby not damaging the bottom surface of the ejector 50 upon sliding.

In the embodiment, as described above, it is arranged that the distal end portions 53 of the jumping prevention springs 52 protrude from the bottom surface of the ejector 50. Accordingly, the jumping prevention springs 52 always abut against the bottom surface 21 of the housing 10, except when the jumping prevention springs 52 are in a released state that the distal end portions 53 deform and protrude into the escape spaces 12. For example, when the ejector 50 slides in the housing 10 toward the direction that the card 3 is pulled out, the distal end portions 53 deform and protrude into the escape spaces 12, so that the jumping prevention springs 52 are in the released state. Accordingly, it is possible to adjust the ejector 50 to slide, thereby preventing the card from jumping out. It is noted that the jumping prevention springs 52 are formed in the ejector 50, not in the cover 30, and the jumping prevention springs 52 hold the bottom surface 21 of the housing 10, not the card 3. When the jumping prevention springs 52 are in the released state in the escape spaces 12, it is not necessary to completely release the jumping prevention springs 52.

When the distal end portions 53 of the jumping prevention springs 52 deform and protrude into the escape spaces 12, the jumping prevention springs 52 push the ejector 50 away from the bottom surface 21 of the housing 10, so that the card 3 placed on the ejector 50 is pushed upwardly against an upper surface 23 of the housing 10. As described above, the pressing springs 40 formed in the cover 30 face the jumping prevention springs 52 and protrude toward the ejector 50 as the elastic pieces. Accordingly, the pressing springs 40 push the card 3 downwardly in a direction opposite to the direction that the jumping prevention springs 52 push the card 3. Accordingly, with the jumping prevention springs 52 and the pressing springs 40, it is possible to stably hold the card 3 inbetween the ejector 50 and the cover 30, thereby effectively preventing the card 3 from jumping out.

In the embodiment, the escape spaces 12 or through holes are formed in the bottom surface 21 of the housing 10 at positions along the direction that the card 3 is inserted and pulled out corresponding to the jumping prevention springs 52 for receiving the distal end portions 53 of the jumping prevention springs 52. With this configuration, it is possible to control a force of holding the card 3. Step portions 13 inclined downwardly toward the front side may be formed in the escape spaces 12, so that the distal end portions 53 are smoothly guided into the escape spaces 12.

In the conventional connector, as shown in FIGS. 6(a) and 6(B), a card 3' is pressed from one side or above. Accordingly, it is necessary to push the card 3' with a large force. Further, the card 3' tends to be inclined in an extent larger than that of the embodiment in which the ejector 50 shown in FIGS. 5(a) and 5(b) is used. Accordingly, in the conventional connector, it is difficult to securely connect the card 3' to the terminals 20. In the embodiment, the escape spaces 12 are formed in the bottom surface 21 of the housing 10 for receiving the distal end portions 53 of the jumping prevention springs 52. Accordingly, it is possible to stably hold the card 3 in a well-balanced state in a vertical direction and prevent the card 3 from being inclined.

In the embodiment, the escape spaces 12 are effective for preventing the card 3 from jumping out when the card 3 is ejected from the card connector 1. When the spring 70 pushes the ejector 50 with the card 3 placed thereon in the direction that the card 3 is pulled out from the card connector 1, i.e., from the state shown in FIGS. 4(b) and 5(b) to the state shown in FIGS. 4(b) and 5(b), the jumping prevention springs 52 of the ejector 50, especially rear surfaces of the distal end portions 53, abut against rear side surfaces 17 in the escape spaces 12. Accordingly, it is possible to greatly reduce an initial strong force of the spring 70.

Further, the jumping prevention springs 52 are always pressed against the bottom surface 21 of the housing 10. Accordingly, after the jumping prevention springs 52 of the ejector 50 abut against the rear side surfaces 17 in the escape spaces 12, when the distal end portions 53 move over the rear side surfaces 17, it is possible to properly control the force of the spring 70. In the embodiment, the card 3 is held on the ejector 50 in the width direction thereof with the sidewall 51 and the card contacting portion 59. Accordingly, in addition to holding the card 3 in the escape spaces 12 in the vertical direction, it is possible to effectively prevent the card 3 from jumping out.

A pin fixing hole 48 protruding toward one side in the width direction of the ejector 50 is provided in the ejector 50 at a front side position thereof for engaging the pin 60 in a state that an ejector fixing portion of the pin 60 hooks the pin fixing hole 48. As described above, the pin 60 engages the ejector 50 to move inside the housing 10 together with the ejector 50. Accordingly, a hart cam engaging portion 61 extending from a distal end portion of the pin 60 at a right angle slides along the cam groove 66 of a hart cam mechanism 64 formed along the direction that the card 3 is inserted and pulled out. The cam groove 66 has a hart shape surrounding a hart-shaped island portion 67 disposed at a center of the hart cam mechanism 64.

A first pressing spring 32 and a second pressing spring 34 are formed in the cover 30 for holing the pin 60 in the cam groove 66 not to come out. The first pressing spring 32 and second pressing spring 34 are formed of cut portions formed in an upper plate of the cover 30. The first pressing spring 32 and second pressing spring 34 have free end portions extending in the direction that the card 3 is inserted into the card connector 1 and bent downwardly toward the front side of the card connector 1.

Figure 7:
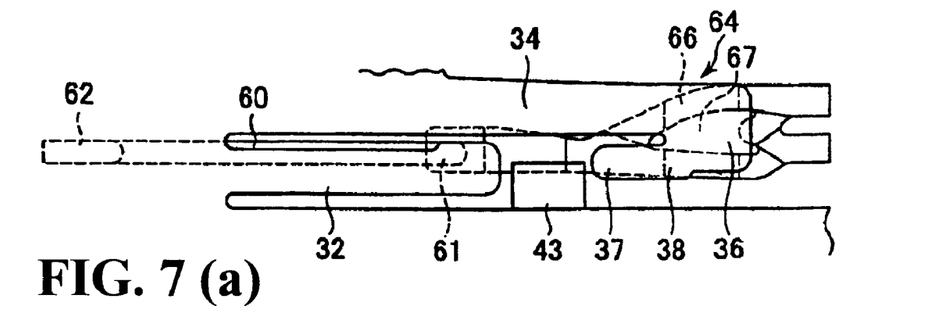
FIGS. 7(a) to 7(d) are side views showing an ejection mechanism having a hart cam.
Figure 8:
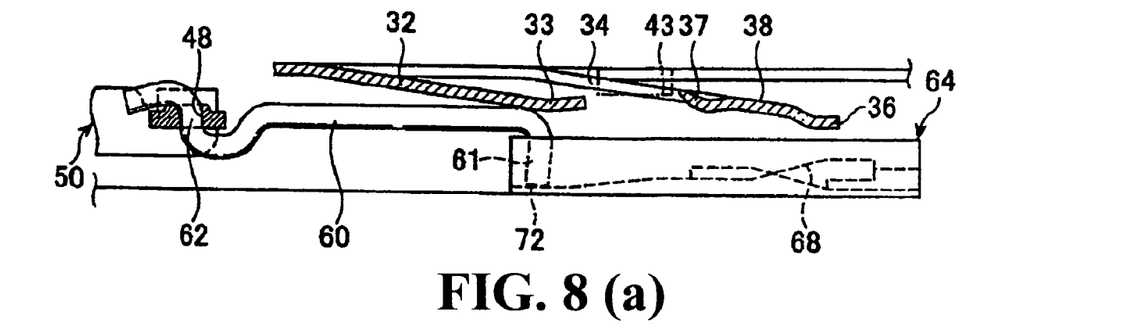
FIGS. 8(a) to 8(d) are side views showing the ejection mechanism having the hart cam corresponding to FIGS. 7(a) to 7(d)

With reference to FIGS. 7(*a*)–7(*d*) and 8(*a*)–8(*d*), a movement of the pin 60 in the hart cam mechanism 64 as well as functions of the first pressing spring 32 and the second pressing spring 34 will be explained in more detail. FIGS. 7(*a*) to 7(*d*) are side views showing a configuration surrounding a cam. FIGS. 8(*a*) to 8(*d*) are side views showing the configuration corresponding to FIGS. 7(*a*) to 7(*d*).

FIGS. 7(*a*) and 8(*a*) correspond to FIG. 4(*a*) showing the state that the card 3 is simply placed on the ejector 50 before the card 3 is pushed into the housing 10, or the hart cam mechanism 64 is released from a locked state just before the card 3 is pulled out from the housing 10 (in this state, the pin 60 is situated at the pulled-out position). FIGS. 7(*b*) and 8(*b*) show a state that the pin 60 is pushed into the card connector 1 to move from the state shown in FIGS. 7(*a*) and 8(*a*) to the state shown in FIGS. 7(*c*) and 8(*c*). FIGS. 7(*c*) and 8(*c*) correspond to FIG. 4(*b*) showing the state that the card 3 is locked with the hart cam mechanism 64 after the card 3 is pushed into the housing 10 and then released (in this state, the pin 60 is situated at the locked position). FIGS. 7(*d*) and 8(*d*) show a state that the pin 60 is pushed into the card connector 1 to move from the state shown in FIGS. 7(*c*) and 8(*c*) to the state shown in FIGS. 7(*a*) and 8(*a*), thereby taking the card 3 out of the card connector 1.

In the embodiment, the first pressing spring 32 and the second pressing spring 34 are arranged in parallel above the pin 60 along the direction that the pin 60 moves or the card 3 is inserted into and pulled out from the card connector 1. Further, the second pressing spring 34 is arranged ahead of the first pressing spring 32 toward the front side of the card connector 1, and the second pressing spring 34 has a wide distal end. That is, a part of a distal end portion 36 extends toward the first pressing spring 32 in a direction crossing or perpendicular to the direction that the card 3 is inserted into and pulled out from the card connector 1. With the configuration, it is possible to situate the first pressing spring 32 and a part of the second pressing spring 34 right above the pin 60. Accordingly, the first pressing spring 32 and the second pressing spring 34 are overlapped with each other above the pin 60 along the direction that the pin 60 moves or the card 3 is inserted into and pulled out from the card connector 1.

In the embodiment, with the configuration described above, it is possible to hold the pin 60 from above at the two locations with the two springs along the direction that the card 3 is inserted into and pulled out. When the pin 60 moves, the distal end portion of the pin 60 is stably held downwardly with at least one of the first pressing spring 32 and the second pressing spring 34, even though the pin 60 does not have a full stroke length. Especially, it is possible to hold the distal end portion of the pin 60 toward the cam groove 66 at the locked state and the released state, i.e., important states for smooth operation, thereby effectively preventing the hart cam engaging portion 61 of the pin 60 from shifting upwardly.

As described above, the second pressing spring 34 has the distal end portion 36 having a large width for covering a size of the cam groove 66 of the hart cam mechanism 64 in the direction perpendicular to the direction that the card 3 is inserted into and pulled out. Accordingly, it is possible to cover the movement of the pin 60 in the width direction. Further, a guide portion 38 may be formed at the distal end portion 36 of the second pressing spring 34 as a branch portion thereof divided toward the rear side of the card connector 1 for smoothly guiding the pin 60. The guide portion 38 is formed as a free end extending from the distal end portion 36 in the direction that the card 3 is pulled out. In the embodiment, it is not necessary to hold the pin 60 at the two locations with the two springs.

With reference to FIGS. 7(*a*)–7(*d*) and 8(*a*)–8(*d*), operations of the first pressing spring 32 and the second pressing spring 34 for holding the pin 60 will be explained in more detail. As shown in FIGS. 7(*a*) and 8(*a*), in the state that the card 3 is simply placed on the ejector 50 or just before the card 3 is pulled out from the housing 10, the first pressing spring 32, especially a distal end portion 33 thereof, is arranged above the distal end of the pin 60, i.e., the hart cam engaging portion 61. Accordingly, the first pressing spring 32 completely holds the hart cam engaging portion 61 not to move upwardly. In this state, an edge portion 72 of the hart cam engaging portion 61 is situated at a lower position along a slope 68 of the cam groove 66.

When the pin 60 moves from the state shown in FIG. 7(*a*) to the state shown FIG. 7(*b*), the position of the pin 60 held by the first pressing spring 32 gradually moves from a position near the hart cam engaging portion 61 toward the pin fixing hole 48. At the same time, the upper portion of the hart cam engaging portion 61 is guided under a distal end portion 37 of the guide portion 38 to a lower side of the distal end portion 36. Accordingly, in this state, the second pressing spring 34 completely holds the hart cam engaging portion 61 not to move upwardly. Further, in this state, the edge portion 72 of the hart cam engaging portion 61 slightly moves upwardly along the slope 68 of the cam groove 66.

Afterward, with the hart cam mechanism 64, the pin 60 slightly moves toward the rear side of the card connector 1 from the state shown in FIG. 7(*b*) to the state shown FIG. 7(*c*), thereby being locked with the hart cam mechanism 64. At this time, the upper portion of the hart cam engaging portion 61 is still situated below the lower side of the distal end portion 36. Accordingly, in this state, the second pressing spring 34 completely holds the hart cam engaging portion 61 not to move upwardly. Further, in this state, the edge portion 72 of the hart cam engaging portion 61 is situated at a lower position along the slope 68 of the cam groove 66.

When the pin 60 is released from the state locked by the hart cam mechanism 64 from the state shown in FIG. 7(*c*) to the state shown FIG. 7(*d*), the pin 60 returns to the front side of the card connector 1. At this time, the hart cam engaging portion 61 is still situated below the lower side of the distal end portion 36. Accordingly, in this state, the second pressing spring 34 completely holds the hart cam engaging portion 61 not to move upwardly. Further, in this state, the edge portion 72 of the hart cam engaging portion 61 is situated at a lower position along the slope 68 of the cam groove 66.

When the pin 60 returns from the state shown in FIG. 7(d) to the state shown FIG. 7(a), the pin 60 is guided from the lower side of the distal end portion 36 to the lower side of the first pressing spring 32. Accordingly, in this state, the first pressing spring 32 completely holds the hart cam engaging portion 61 not to move upwardly. A pin fixing rib 43 extending in a direction perpendicular to the direction that the card 3 is inserted into and pulled out may be disposed between the distal end portion 33 of the first pressing spring 32 and the distal end portion 36 of the second pressing spring 34. Accordingly, it is possible to securely hold the hart cam engaging portion 61 when the hart cam engaging portion 61 is guided from the lower side of the distal end portion 36 to the lower side of the first pressing spring 32 or from the lower side of the first pressing spring 32 to the lower side of the distal end portion 36.

In a normal operation, after a finger pushes the card into the card connector, the finger is pulled backward toward the rear side of the card connector along the direction that the card is pulled out. At this time, when the pin 60 returns from the state shown in FIG. 7(d) to the state shown FIG. 7(a), if the finger slips off the card, or intentionally snaps the card an elastic force accumulated in the ejector mechanism may be suddenly released. In the embodiment, the jumping prevention springs 52 reduce the ejection force at an initial stage of the ejection (more specifically, when the distal end portions 53 of the jumping prevention springs 52 are released from the through holes 12). Further, the jumping prevention springs 52 are disposed to face the pressing springs 40 for holding the card 3. Accordingly, it is possible to effectively use a friction force of the pressing springs 40 for braking.

Figure 9:
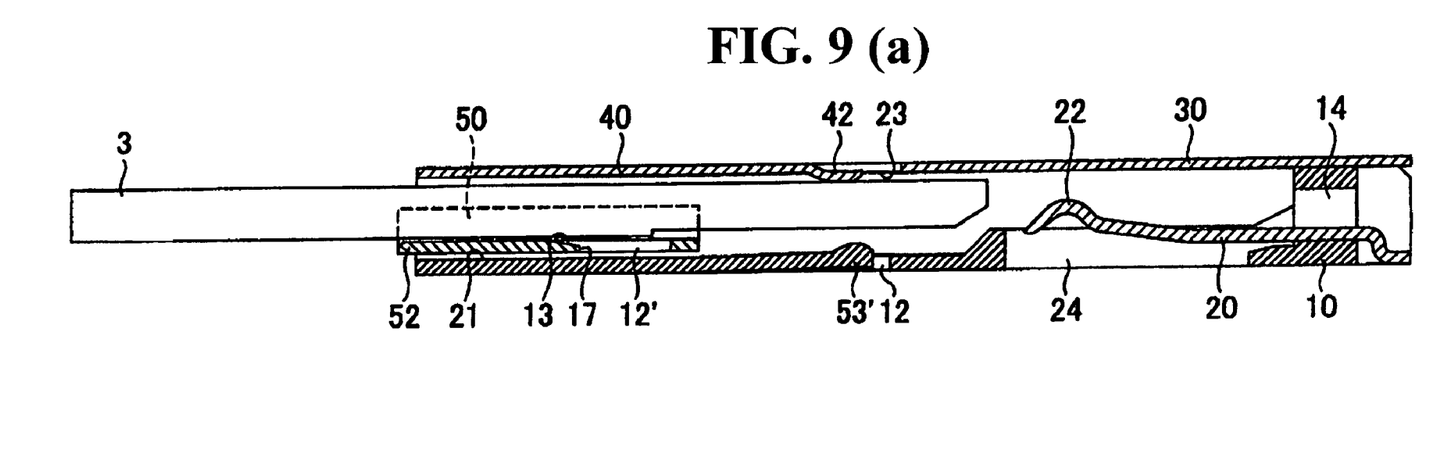
FIGS. 9(a) and 9(b) are sectional views showing a modified example of the card connector shown in FIGS. 5(a) and 5(b).

In the embodiment, the jumping prevention springs 52 are provided in the ejector 50, and the through holes 12 corresponding to the distal end portions 53 of the jumping prevention springs 52 are provided in the bottom surface 21 of the housing 10. Alternatively, as shown in FIGS. 9(a) and 9(b), elastic members 53' corresponding to the distal end portions 53 of the jumping prevention springs 52 may be provided in the housing 10, and holes or grooves 12' corresponding to the through holes 12 of the housing 10 may be provided in the ejector 50. FIGS. 9(a) and 9(b) correspond to FIGS. 5(a) and 5(b).

In the embodiment, the jumping prevention springs 52 are provided to face the bottom surface, and may be provided to face a side surface. For example, when the sidewall 51 of the ejector 50 is arranged to abut against the jumping prevention springs 52, the jumping prevention springs 52 may be disposed in the inner walls 18 of the housing 10 between the sidewall 51 and the opening portion. In either case, the jumping prevention springs 52 engage a specific portion of the card 3 abut against the wall surfaces of the through holes 12 to elastically deform when the card 3 is pulled out, thereby absorbing the ejection force.

The holes or grooves 12' have a shape corresponding to the jumping prevention springs 52. Accordingly, the jumping prevention springs 52 may be arranged to abut against inclined surfaces. Further, spring members may be provided for greatly deforming when being pushed by the distal end portions 53 of the jumping prevention springs 52, thereby creating a state accumulating an elastic force at least once when moving to a position for pulling the card 3 out.

With the configuration described above, when the ejector 50 moves from the locked position to the position with the spring 70 for pulling the card 3 out, the jumping prevention springs 52 disposed between the ejector 50 and the housing brake the movement of the ejector 50, thereby preventing the card from being disengaged from the ejector 50 and jumping out of the card connector 1.

The disclosure of Japanese Patent Application No. 2005-194944, filed on Jul. 4, 2005, is incorporated in the application.

While the invention has been explained with reference to the specific embodiments of the invention, the explanation is illustrative and the invention is limited only by the appended claims.

What is claimed is:

1. A card connector for inserting a card, comprising:
   a housing for accommodating the card;
   a terminal for contacting with the card when the card is inserted into the housing;
   an ejection unit for placing the card and capable of sliding in the housing along a first direction that the card is inserted into the housing and a second direction that the card is pulled out from the housing;
   a spring member for urging the ejection unit in the second direction; and
   an elastic member disposed in one of the ejection unit and the housing for pushing the ejection unit upwardly when the card is disconnected from the terminal, the other of said ejection unit and said housing including an escape space so that the escape space releases the elastic member when the card is connected to the terminal.

2. The card connector according to claim 1, further comprising a wall surface disposed adjacent to the escape space, said wall surface extending in a third direction crossing the first direction and the second direction.

3. The card connector according to claim 1, wherein said other of the ejection unit and the housing includes a hole or a groove as the escape space.

4. The card connector according to claim 1, wherein said elastic member is formed of a first elastic piece disposed in the ejection unit, said housing including a bottom surface having the escape space.

5. The card connector according to claim 1, wherein said elastic member is disposed on a bottom surface of the housing.

6. The card connector according to claim 1, wherein said elastic member is arranged such that the elastic member is disengaged from the escape space when the ejection unit starts sliding toward the second direction.

7. The card connector according to claim 1, further comprising an inclined portion extending from the escape space in the second direction.

8. The card connector according to claim 1, wherein said elastic member is arranged to come off the escape space to control a force of the spring member so that the card does not jump out from the housing when the ejection unit slides in the housing toward the second direction to disconnect the card from the terminal.

9. The electric connector according to claim 1, further comprising a protruding portion for holding the ejection unit together with the elastic member.

10. The card connector according to claim 1, wherein said protruding portion is formed of a second elastic piece.

* * * * *